Inventor:
Luther L. Genuit,
by Henry J. Marciniak
Attorney.

Inventor:
Luther L. Genuit,
by Harry J. Marciniak
Attorney.

United States Patent Office 3,244,962
Patented Apr. 5, 1966

3,244,962
SILICON CONTROLLED RECTIFIER CIRCUIT WITH FIRING MEANS EMPLOYING SERIALLY CONNECTED LINEAR AND SATURABLE REACTORS
Luther L. Genuit, Scottsdale, Ariz., assignor to General Electric Company, a corporation of New York
Filed Apr. 19, 1961, Ser. No. 104,108
11 Claims. (Cl. 323—22)

This invention relates to phase control and switching circuits and more particularly to phase control and switching circuits utilizing controlled semiconductor rectifiers to regulate the interval of current conduction to a load during each half cycle of an alternating current supply to which such circuit is connected.

The interval of current conduction in each half cycle of an alternating current supply may be controlled by employing one or more solid state switching elements, such as silicon controlled rectifiers, which are fired at a predetermined point at each half cycle. The phase angle at which the switching elements are fired determines the interval of current conduction. Generally, the phase control portion of the circuit provides a current or voltage signal to fire the controlled rectifier at the predetermined point in each half cycle. In order that an equal loading of each phase of the alternating current supply is obtained, the phase control and switching circuit is operated symmetrically with respect to each phase of the input alternating current.

Phase control and switching circuits are readily adaptable to control the luminous intensity of a large group of lamps without the need for motor driven or heavy mechanical controls. By utilizing static components in phase control and switching circuits, it has been possible to provide lamp dimming systems which are only a small fraction of the size and weight of conventional systems utilizing mechanical controls for performing comparable functions. Since the firing angle at which the controlled rectifiers are fired controls the luminous intensity of the lamps operated by the system and since the phase control the switching circuit is energized from the same power source as the lamps, it is desirable that voltage fluctuations in the power source do not affect the operation of the circuit. Thus, if the phase control portion of the circuit is sensitive to such voltage fluctuations, the firing angle at which a controlled rectifier is fired will be affected. Consequently, the interval of current conduction to the lamps will vary, and the lamps will flicker.

It is another requirement of such a phase control and switching circuit that a small load be provided for the controlled rectifier during the ionization period of the lamps to prevent the controlled rectifiers from being prematurely cut off in a half cycle. Further, for reasons of economy, it is desirable that controlled rectifiers of relatively low volt-ampere ratings be adaptable for use in the phase control and switching circuit.

Accordingly, an object of this invention is to provide an improved phase control and switching circuit employing controlled rectifiers whereby the firing angle at which the controlled rectifiers are fired is not appreciably affected by fluctuations in the voltage of the power supply.

Another object of the invention is to provide an improved phase control and switching network employing controlled rectifiers wherein controlled rectifiers of relatively low volt-ampere ratings can be employed.

It is still a further object of the present invention to provide an improved phase control and switching circuit that is readily adaptable for use in conjunction with a fluorescent lamp dimming system wherein the lamps are effectively dimmed by controlling the interval of current conduction to the lamps during each half cycle of the power supply.

The foregoing and other objects and advantages of the invention are realized by a phase control and switching circuit wherein the phase control portion of the circuit utilizes essentially static components to fire the controlled rectifiers at a predetermined point at each half cycle and thereby control the interval of current conduction to a load such as fluorescent lamps. The phase control portion of the circuit includes a serially connected saturable reactor and a linear reactor, one of the reactors having inductively coupled thereon a pair of secondary windings. Each of the windings are connected in circuit across the gate and cathode of a controlled rectifier. A means for applying a voltage variable in phase relative to the alternating current supply is connected across the serially connected saturable reactor and linear reactor. When the saturable reactor is saturated, a pulse of current flows in the secondary windings of the reactor. The point in each half cycle when the controlled rectifiers are fired is controlled by varying the phase angle of the voltage applied across the serially connected saturable reactor and linear reactor.

In another aspect of the invention, the means for applying a voltage substantially constant in magnitude but variable in phase across the serially connected saturable reactor and linear reactor is comprised of a first capacitor and a second capacitor which are serially connected across the alternating current supply so that at least a portion of the supply voltage is applied across the first and second capacitors. A variable resistor and a third capacitor are connected in series circuit relationship across the first and second capacitor. The serially connected linear reactor and saturable reactor are connected in circuit across the first and the third capacitor. The phase angle of the voltage across the serially connected saturable reactor and linear reactor is adjusted by the variable resistance means.

Further, in another form of the invention, I have provided a circuit arrangement wherein the means for applying a voltage variable in phase relative to the supply of voltage across the serially connected linear reactor and saturable reactor is comprised of a first capacitor and reactor connected across a pair of input terminal leads so that at least a portion of the alternating current supply voltage is applied across the first capacitor and reactor. A resistor is connected in shunt with the reactor. A variable resistor and a second capacitor are connected in parallel circuit relationship with each other and in series circuit relationship with the serially connected linear and saturable reactor across the first capacitor. The phase of the voltage across the serially connected saturable and linear reactor is adjusted by the variable resistor.

According to another aspect of the invention, I have provided a phase control and switching circuit employing an impedance element connected in circuit across the switching network lead and one of the input terminal leads of the phase control and switching circuit wherein a voltage divider action is provided so that only a proportional part of a ballast transformer voltage appears across the controlled rectifier in the switching circuit during open circuit condition of the ballast transformer. Moreover, the resistor in this circuit arrangement also places a resistive load in circuit with the controlled rectifiers so that a holding current flows through the conducting rectifier to prevent the rectifier from being prematurely turned off.

The subject matter which I regard as my invention is set forth in the appended claims. The invention itself, however, together with further objects and advantages thereof may be understood by referring to the following description taken in connection with the accompanying drawings in which:

Figure 1:
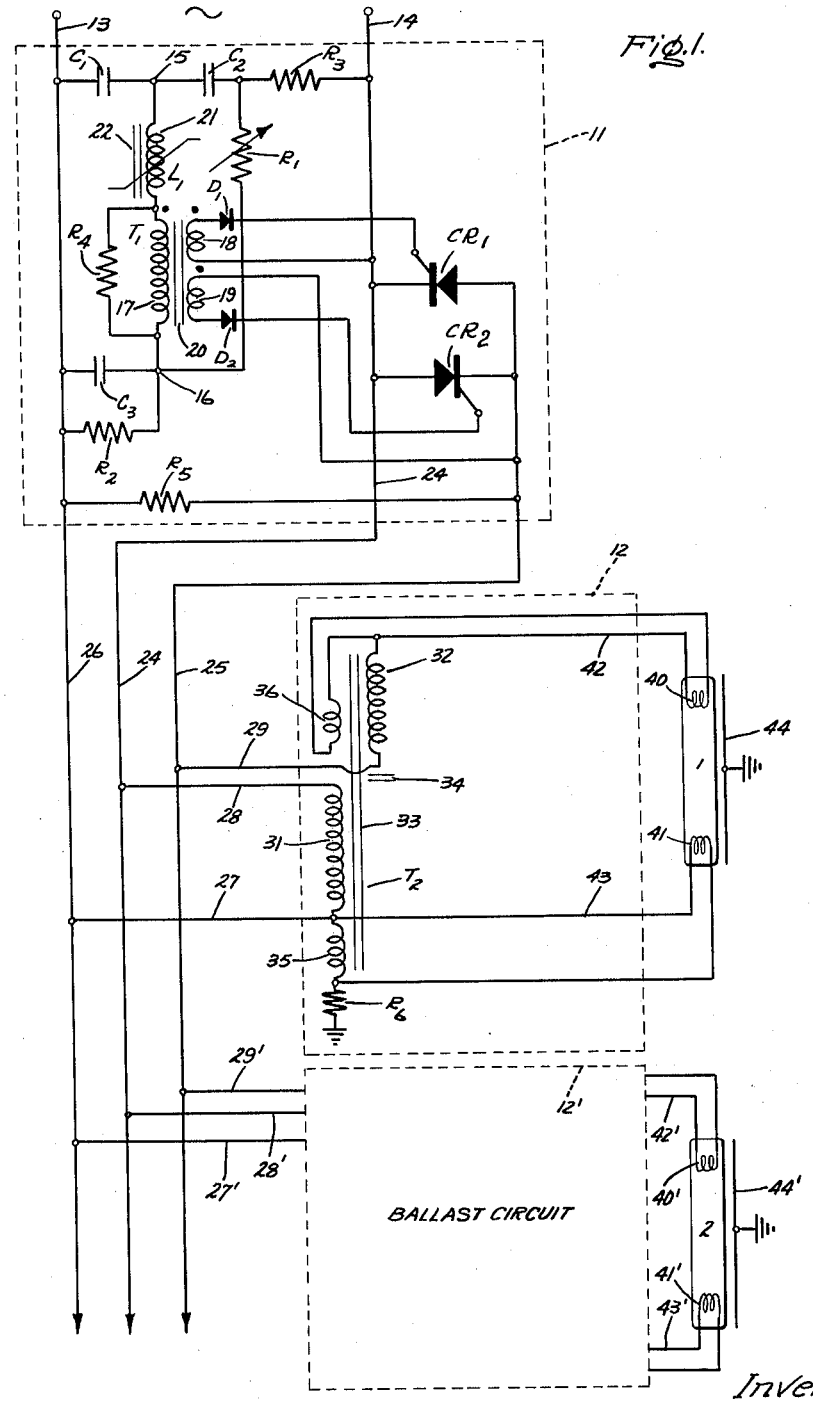
FIG. 1 is a schematic circuit diagram of a phase control and a switching circuit of the invention used in conjunction with a plurality of ballast circuits.

In FIG. 1 I have illustrated a phase control and switching circuit that is identified generally by reference numeral 11 and is shown enclosed in the dashed rectangle. Ballast circuits are identified generally by the reference numerals 12, 12', the components thereof being enclosed in dashed rectangles 12, 12'. Although two ballast circuits 12, 12' and their associated fluorescent lamps 1, 2 are shown it will be appreciated that a plurality of such ballast circuits and lamps may be operated in conjunction with phase control and switching circuit 11. Since all of the ballast circuits are identical, the internal circuit connections are illustrated only for ballast circuit 12. A pair of input terminal leads 13, 14 are provided for connecting the phase control and switching circuit 11 to a suitable power source (not shown) such as a 118 volt, 60 cycle power supply.

As shown in FIG. 1, phase control and switching circuit 11 includes a first capacitor $C_1$ and a second capacitor $C_2$ serially connected at a first junction 15, a variable resistor $R_1$ and a third capacitor $C_3$ serially connected at a second junction 16 across the serially connected capacitors $C_1$ and $C_2$. Connected across junctions 15 and 16 are a saturable reactor $L_1$ and a transformer $T_1$ having a primary winding 17 and two secondary windings 18, 19 inductively coupled therewith on a magnetic core 20. It will be seen that the saturable reactor $L_1$ and primary winding 17 of the transformer $T_1$ are serially connected across variable resistor $R_1$ and capacitor $C_2$. A resistor $R_2$ is connected across capacitor $C_3$ to provide phase correction at the extremities of the control range. Resistor $R_3$ is used in conjunction with $R_2$ for the phase correction function. A resistor $R_4$ may be connected across the primary winding 17 to adjust the impedance of transformer $T_1$ so that its impedance will be properly related to the saturated and unsaturated impedances of $L_1$. Thus, as shown in FIG. 1, the phase control and SCR trigger circuit includes capacitor $C_1$, $C_2$, $C_3$, the resistors $R_1$, $R_2$, $R_3$, $R_4$, saturable reactor $L_1$, transformer $T_1$ and diodes $D_1$, $D_2$.

The phase control circuit portion of circuit 11 applies a voltage of essentially constant magnitude across the saturable reactor $L_1$ and the primary winding 17 of the transformer $T_1$ or across junctions 15, 16. Saturable reactor $L_1$ includes a winding 21 and a magnetic core 22 characterized by a suitable magnetic material having a square loop magnetization curve. Transformer $T_1$ is a pulse transformer and provides D.C. isolation and A.C. coupling with the secondary windings 18, 19. The saturable reactor $L_1$ presents a high impedance to any current flow between junctions 15, 16 until saturable reactor $L_1$ saturates at which point the impedance decreases suddenly and a pulse of current is provided through the primary winding 17 of transformer $T_2$. As shown by the polarity marks, when the polarity of the voltage across the primary winding 17 is such that the upper end is positive, the voltage induced across secondary windings 18, 19 is such that their upper ends are positive.

Control rectifiers $CR_1$ and $CR_2$ are PNPN semiconductors each having three terminals, an anode represented by the arrow symbol, a cathode represented by the line drawn through the apex of the arrow symbol and a gate represented by the diagonal line extending from the cathode. It will be noted that controlled rectifiers $CR_1$, $CR_2$, are connected in inverse parallel relationship across switching line 25 and supply line 24 connected to input lead 14 which is the input lead provided for connection to the ungrounded side of the power supply. In such an arrangement, controlled rectifier $CR_1$ when switched on permits current from input lead 14 to flow in one direction to switching line 25. Controlled rectifier $CR_2$ when switched on permits a current flow to switching line 25 in an opposite direction. In other words, the controlled rectifiers $CR_1$, $CR_2$ function as switching elements in the negative and positive halves of each cycle of the alternating current supply. It will be noted that the gate of controlled rectifier $CR_1$ is connected in circuit with secondary winding 18 while the gate of controlled rectifier $CR_2$ is connected with secondary winding 19 of pulse transformer $T_1$. Diodes $D_1$ and $D_2$ are poled so that one of the controlled rectifiers $CR_1$, $CR_2$ is fired during each negative half cycle and the other one is fired during each positive half cycle.

Preferably, silicon controlled rectifiers may be used as switching elements $CR_1$, $CR_2$ since the operating characteristics of a silicon controlled rectifier are such that it conducts in a forward direction with a forward characteristic very similar to that of an ordinary rectifier when a gate signal is applied. Thereafter, the controlled rectifier continues conduction even after the gate signal is removed, provided that a minimum holding current is supplied to controlled rectifier $CR_1$, $CR_2$.

In the illustrative embodiment of the invention, I have provided an impedance element such as a resistor $R_5$ connected at one end to supply line 26 which is connected in circuit input terminal lead 13, the lead provided for connection to the grounded side of the power supply, and at the other end it is connected in circuit with the switching line 25. The resistor $R_5$ serves a dual purpose. First of all, it provides a small load for the conducting controlled rectifier $CR_1$, $CR_2$ during the ionization period of the fluorescent lamp 1, 2. By virtue of this load, the necessary holding current required to maintain the controlled rectifier $CR_1$, $CR_2$ in conduction is supplied until fluorescent lamp 1, 2 are ignited. Further, the resistor $R_5$ as connected in the phase control and switching circuit 11 reduces the voltage rating requirement of the controlled rectifiers. I will be noted that without the resistor $R_5$, the controlled rectifiers $CR_1$, $CR_2$ would be subjected to the entire open circuit voltage of the ballast circuit 12. Thus, resistor $R_5$ provides a voltage divider action across the supply line 26, the controlled rectifiers $CR_1$, $CR_2$ and supply line 24. As a result, controlled rectifiers $CR_1$, $CR_2$ are only subjected to a proportional part of the ballast voltage during the period that the lamps are being initially started, substantially all of the open circuit voltage of the ballast circuit 12 appearing across the lamp 1.

The supply lines 24, 26 and switching line 25 provide power and switching connections for the individual ballast circuits 12, 12'. Additional ballast circuits or ballasts may be connected to the supply lines 24, 26, the total number being limited by the volt-ampere rating of the controlled rectifiers $CR_1$, $CR_2$ employed in the switching network portion of the phase control and switching circuit 11.

Continuing with the detailed description, the ballast circuits 12, 12' shown in FIG. 1 are connected to supply lines 24, 26 and switching line 25 by ballast input leads 27, 27', 28, 28' and switching network lead 29, 29', respectively. Referring now to the internal circuit connections, ballast circuit 12 includes a high reactance transformer $T_2$ having a primary winding 31, a secondary winding 32, a magnetic core 33, magnetic shunts 34, and filament windings 35, 36. The primary winding 31 is connected across the ballast input leads 27, 28 which are connected to supply lines 24, 26. It will be seen therefore that the supply voltage is applied across the primary winding 31 and that the switching action of controlled rectifiers $CR_1$, $CR_2$ does not affect the applied voltage across the primary winding 31.

In the dimming system shown in FIG. 1, preferably rapid start fluorescent lamps may be used. Each of the lamps 1, 2 is comprised of an elongated tubular cylindrical envelope having sealed into the ends thereof filamentary cathodes 40, 40', 41, 41'. The lamps 1, 2 are connected across output leads 42, 43 and 42', 43', respectively. Cathode heating windings 35, 36 of ballast circuit 12 are connected in circuit with cathodes 40, 41 and supply a heating current to the cathodes 40, 41. A grounded conductive plate 44, 44', such as a fixture may be located in proximity to lamps 1, 2. As shown in circuit diagram of ballast circuit 12, the grounded plate 44 serves in conjunction with a grounded resistor $R_6$ as a starting aid to apply a starting potential to one of the cathodes 40, 41.

Figure 2:
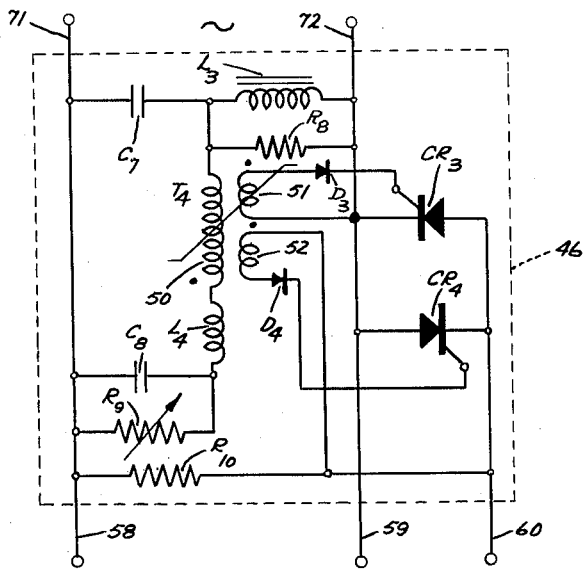
FIG. 2 is a schematic circuit diagram of a phase control and switching circuit illustrating another embodiment of the invention.

Having reference now to the phase control and switching circuit generally identified in FIG. 2 by the reference numeral 46 and enclosed in the dashed rectangle 46, I have illustrated therein a modification of the phase control circuit shown in FIG. 1. The phase control and firing circuit includes a pair of input terminal leads 71, 72, a serially connected inductor $L_3$ and capacitor $C_7$, a capacitor $C_8$, resistors $R_8$, $R_9$, $R_{10}$, a serially connected inductor $L_4$ and saturable transformer $T_4$ having a primary winding 50 and secondary windings 51, 52, diodes $D_3$, $D_4$ and controlled rectifiers $CR_3$, $CR_4$. The variable resistor $R_9$ connected across capacitor $C_8$ varies the phase angle of the voltage applied to the saturable transformer $T_4$.

Controlled rectifiers $CR_3$ and $CR_4$ are connected in inverse parallel relationship across supply line 59 and the switching network line 60. Resistor $R_{10}$ is connected in circuit across the supply line 58 and switching network line 60. It will be seen that by virtue of this connection only a proportional part of the total ballast voltage is applied across the controlled rectifiers $CR_3$, $CR_4$. Resistor $R_{10}$ also provides a resistive load in circuit with the conducting controlled rectifier so that a holding current is supplied to it during the ionization period of the lamps 3, 4 to prevent the rectifier from being prematurely turned off in the half cycle.

Figure 3:
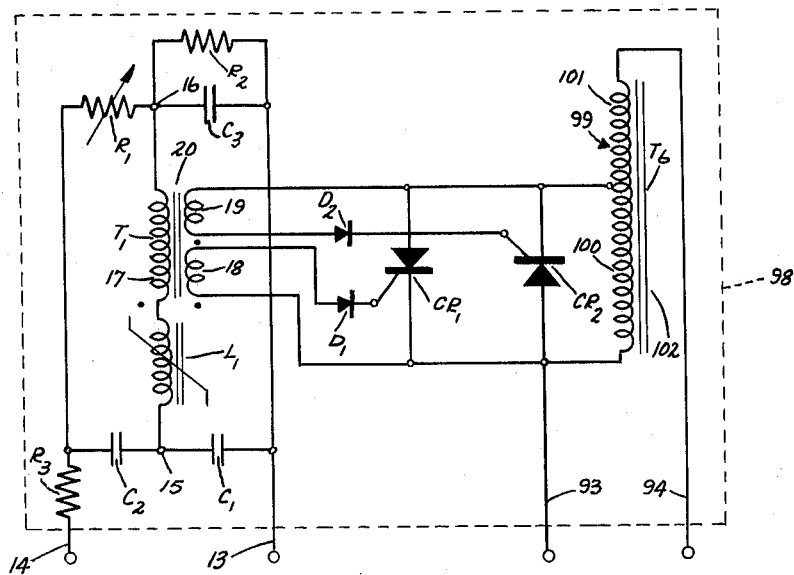
FIG. 3 is a schematic circuit diagram of a phase control and switching circuit illustrating an embodiment of the invention in which an autotransformer is employed in the switching network portion thereof.

In FIG. 3, I have illustrated a phase control and switching circuit which is shown enclosed in the dashed rectangle 98 and generally identified by numeral 98. The phase control and switching circuit 98 is substantially similar in operation to the phase control and switching circuit 11 illustrated in FIG. 1. Accordingly, corresponding components thereof are identified by the same reference numerals and letters. Thus, input terminal leads 13, 14 are provided for connection across the alternating current supply (not shown). A resistor $R_3$ is connected in circuit with the input lead 14 which is the lead provided for connection to the ungrounded side of the power supply. Capacitors $C_1$ and $C_2$ and resistor $R_3$ are serially connected across input terminal leads 13, 14 with $C_1$ and $C_2$ joined at a first junction 15. A variable resistor $R_1$ and a third capacitor $C_3$ are serially connected across capacitors $C_1$, $C_2$ and joined at a second junction 16. A resistor $R_2$ is connected in circuit with the second junction 16 and the grounded input lead. Resistor $R_2$ in conjunction with $R_3$ provides phase correction at the extremities of the phase control range. A saturable reactor $L_1$ is serially connected with primary winding 17 of pulse transformer $T_1$. To alternately fire one of the controlled rectifiers $CR_1$, $CR_2$ during each half cycle, diodes $D_1$ and $D_2$ are poled so that one of the diodes conducts in one half cycle to supply a current pulse to one of the controlled rectifiers while the other diode conducts in the next half cycle.

In this embodiment of the invention, a transformer $T_6$ was employed to match the total voltage of the load circuit connected across the switching network lines 93, 94, which may be a plurality of ballast circuits such as are shown in FIG. 1, with the voltage rating of the controlled rectifiers $CR_1$, $CR_2$. The use of the transformer $T_6$ in the system provides the advantage that controlled rectifiers $CR_1$, $CR_2$ can be employed in a system even though they may not have a sufficient voltage rating to handle the full range of voltages developed in the load circuit (not shown).

It will be seen that transformer $T_6$ includes an autotransformer winding 99 having a primary winding portion 100 connected across the controlled rectifiers $CR_1$, $CR_2$ and a secondary winding portion 101 inductively coupled on a magnetic core 102. In this arrangement the autotransformer winding 99 is connected across the switching network lines 93, 94 to step-down the voltage appearing across lines 93, 94 under open circuit conditions where a load such as a plurality of ballast circuits are connected in circuit with lines 93, 94.

Figure 4:
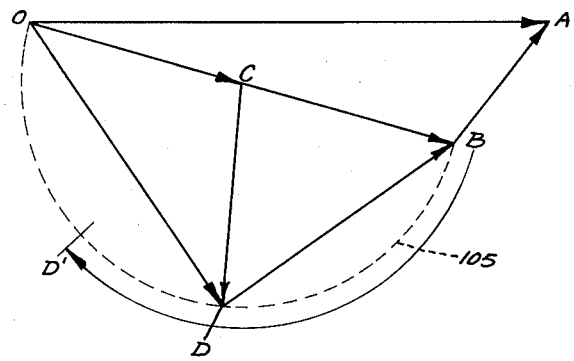
FIG. 4 is a vector diagram illustrating the operation of the phase control circuit shown in FIG. 1.

Having reference to the vector diagram shown in FIG. 4 and the circuit shown in FIG. 1, the operation of the phase control and switching circuit 11 will now be more fully described. The operation of the phase control and switching circuit 11 is initiated by energizing the power input terminal leads 13, 14. In the vector diagram shown in FIG. 4, vector OA represents line voltage as applied to terminals 13, 14 of FIG. 1. Vector OC represents the voltage across capacitor $C_1$, vector CB the voltage across $C_2$, vector BA the voltage across the resistor $R_3$, vector OD the voltage across the capacitor $C_3$, vector DB the voltage across the resistor $R_1$, and vector CD represents the voltage impressed across serially connected reactor $L_1$ and transformer $T_1$. If the currents drawn by the reactor $L_1$ and transformer $T_1$ and resistors $R_2$ and $R_4$ are neglected, vectors OD and DB are at right angles as shown and point D moves along semicircle 105 as the value of resistor $R_1$ is varied. It will be appreciated, of course, that as the value of resistor $R_1$ is varied, the magnitudes and phase angles of vectors OC, CB and BA will change. This effect is also neglected in the simplified discussion of phase angle adjustment that follows.

On the basis of the assumptions mentioned above, the current that flows through resistor $R_1$ also flows through capacitor $C_3$ and voltage vectors OD and DB will thus be at right angles for all values of resistance provided by the resistor $R_1$. Furthermore, the sum of vectors OD and DB will be constant and will equal vector OB. The locus of point D for all values of the resistor $R_1$ is thus seen to describe semicircle 105, and if vector OC is equal to vector CB, vector CD is seen to be a radius of semicircle 105. Vector CD will therefore remain constant in magnitude but its phase angle will change as variable resistor $R_1$ is adjusted. For example, if resistor $R_1$ is set at zero, vector DB is zero, and vector CD lies among vector CB. Vector CD lags line voltage vector OA by a minimum phase angle for this condition. As the setting of variable resistor $R_1$ is increased, the point D moves along the semicircle 105 as indicated by arc BD' and the phase angle between vectors CD and OA increases to its maximum value at point D' corresponding to the maximum value of variable resistor $R_1$.

For maximum dimming range, the firing angle of the controlled rectifiers $CR_1$, $CR_2$ should be adjustable over a range extending from 60 degrees to 180 degrees lagging with respect to line voltage. At the 180 degree setting, the controlled rectifiers $CR_1$, $CR_2$ will be called upon to fire at the very end of the half cycle. In this case the controlled rectifiers $CR_1$, $CR_2$ will not turn on at all because the anode to cathode voltage is zero. This is the zero intensity setting. At the 60 degree setting, the controlled rectifiers $CR_1$, $CR_2$ are turned on essentially at the instant the current from the preceeding half cycle has gone to zero (lamp current lags line voltage by approximately 60 degrees because of the inductive ballast). Lamp current and light intensity are thus seen to be maximum for this condition. The range of phase control is determined largely by the ratio of the maximum value of the resistance of resistor $R_1$ to the value of the capacitance of capacitor $C_3$.

It is also necessary to orient this range with respect to line voltage in such a way that the minimum phase angle setting produces a controlled rectifier firing pulse at 60 degrees and the maximum phase angle produces a firing pulse at 180 degrees. Orientation of the phase control range can be accomplished through the proper choice of resistors $R_2$ and $R_3$. It is difficult to determine the correct values of these components analytically because of the nonlinear loading of reactor $L_1$. It is also to be noted that an additional delay is introduced by reactor $L_1$. The reactor $L_1$ is included in the network to provide the sharp leading edge on the firing pulse. Its core is made of a sharply saturating material so that reactor $L_1$ supports the voltage CD for the first few degrees of each half cycle, then saturates very rapidly. At the instant of saturation, voltage CD is impressed across the primary of transformer $T_1$ which couples the trigger voltage to the appropriate controlled rectifier through diodes $D_1$ or $D_2$. The saturation time of the reactor $L_1$ provides a part of the total phase shift required. In the system that was developed and tested, most of the components were determined approximately by calculations and then modified experimentally to provide optimum performance.

Summarizing, the functions of the various components in the phase shift and firing circuit network are as follows: capacitors $C_1$, $C_2$, $C_3$ and resistor $R_1$ constitute the basic phase control network with variable resistor $R_1$ serving as the dimming control. Resistor $R_2$ and $R_3$ provide phase orientation of the phase control range relative to line voltage. Reactor $L_1$ produces the sharp leading edge on the firing pulse (required for consistent firing angle at a given setting). Transformer $T_1$ provides magnetic coupling of the firing pulses to the controlled rectifiers $CR_1$, $CR_2$. Resistor $R_4$ is connected across the primary of transformer $T_1$ to adjust transformer impedance for optimum operation in conjunction with reactor $L_1$. The impedance of transformer $T_1$ must be small relative to the unsaturated impedance of reactor $L_1$, but large relative to the saturated impedance of reactor $L_1$. This relationship can be achieved by appropriate design of the transformer $T_1$, but was more conveniently achieved by addition of resistor $R_4$.

Current conduction to the secondary winding 32 is controlled during each half cycle by the interval of conduction of the controlled rectifiers $CR_1$, $CR_2$ which are poled to conduct alternately in each half cycle. The primary winding 31 of the high reactance ballast transformer $T_2$ is continuously energized during all brightness levels. The instantaneous current during an arbitrarily selected half cycle when $CR_2$ is in a conducting state and after lamp 1 is ignited follows a path which may be traced from input terminal lead 14 through controlled rectifier $CR_2$, switching network line 25, switching terminal lead 29, secondary winding 32, output lead 42, lamp 1, output lead 43, input terminal lead 27, supply line 26 and to input terminal lead 13, the lead provided for connection to the grounded side of the power supply. In the next half cycle when $CR_1$ is in a conducting state and lamp 1 is ignited, the instantaneous current follows substantially the same path in a reverse direction. Thus, the path of current flow may be traced from the input terminal lead 13, supply line 26, the ballast input terminal lead 27, output lead 43, lamp 1, output lead 42, secondary winding 32, switching terminal lead 29, switching network line 25, controlled rectifier $CR_1$ and to input terminal lead 14, the lead provided for connection to the ungrounded side of the power supply.

To operate a plurality of 40 watt fluorescent lamps, the circuit shown in FIG. 1 employed the following circuit components which are identified below and are cited to illustrate a specific reduction to practice of the invention:

Resistor $R_3$ _____ 750 ohms.
Variable resistor $R_1$ __ 0–5,000 ohms.
Resistor $R_2$ _____ 3,000 ohms.
Capacitors $C_1$, $C_2$ ___ 1.8 microfarads.
Inductor $L_1$ _____ Arnold Toroidal Core 2T4635D2 having a cross section approximately ¼ of an inch by ¼ of an inch.
Capacitor $C_3$ _____ .76 microfarad.
Resistor $R_4$ _____ 7,500 ohms.
Resistor $R_5$ _____ 270 ohms.
Transformer $T_1$:
  Primary winding 17 ___ 152 turns.
  Secondary windings 18, 19 ___ 38 turns.
  Controlled rectifiers $CR_1$, $CR_2$ __ General Electric Silicon Controlled Rectifiers ZJ 39A–150.
  Diodes $D_1$, $D_2$ ___ General Electric Diodes IN91.
High reactance transformer $T_2$:
  Primary winding 31 ___ 790 turns.
  Secondary winding 32 ___ 960 turns.

A modified phase control circuit is shown in FIG. 2. The resistor $R_9$ connected in parallel circuit relationship with capacitor $C_8$ serves as the dimming control, the phase system. By adjusting the dimming control, the phase angle of the voltage appearing across the serially connected pulse transformer $T_4$ and inductor $L_4$ is varied. The pulse transformer $T_4$ which includes a primary winding 50 and secondary windings 51, 52 is a saturating reactor and inductor $L_4$ is a linear reactor. The impedance of inductor $L_4$ is considerably less than the unsaturated impedance of transformer $T_4$ but considerably greater than the saturated impedance of transformer $T_4$. The volt-second rating of transformer $T_4$ is such that it can only support a voltage spike at the magnitude of the impressed voltage. The voltage appearing across primary winding 50 of transformer $T_4$ is a spike of voltage taken from the center of each half cycle of the voltage applied across the serially connected inductor $L_4$ and transformer $T_4$.

Figure 5:
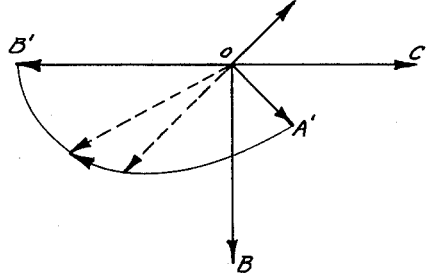
FIG. 5 is a vector diagram illustrating the operation of the phase control circuit shown in FIG. 2.

In FIG. 5 I have illustrated a vector diagram corresponding to the phase control circuit of FIG. 2. Vector OC represents the supply voltage applied at terminals 71, 72. Vector OA represents the voltage appearing across the series connected transformer $T_4$ and inductor $L_4$ when resistor $R_9$ is at its maximum setting (50,000 ohms). For the same setting of resistor $R_9$, vector OA′ represents the spike of voltage appearing across transformer $T_4$ which is 90 degrees delayed relative to vector OA because it is taken from the center (90 degree point) of the half cycle of the voltage vector represented by OA. Vector OB represents the total voltage across transformer $T_4$ plus the voltage across inductor $L_4$ when resistor $R_9$ is at the zero setting, and vector OB′ represents the corresponding voltage spike appearing across transformer $T_4$. It will be noted that the firing angle is controllable from approximately 60 to 180 degrees as it was for the circuit of FIG. 1. In this case, however, as the firing angle is increased the magnitude of the trigger voltage increases. Since the trigger voltage requirement (control grid voltage) increases as anode voltage decreases, this feature provides an advantage.

The phase control and switching circuit 46 shown in FIG. 2 provides the advantage that the phase angle of the voltage across the serially connected saturable reactor or nonlinear pulse transformer $T_4$ and inductor $L_4$ is not appreciably affected by normal variations in voltage supplied to input terminal leads 71, 72. Further, the phase control portion of the circuit 46 uses relatively inexpensive static control elements and does not require the use of semiconductor elements.

Having reference now to the operation of the phase control and switching circuit 98 shown in FIG. 3, it will be seen that it is substantially similar to the phase control and switching circuit hereinbefore described in connection with FIG. 1. The phase control and switching circuit 98 supplies a voltage of substantially constant magnitude across the serially connected reactor $L_1$ and the pulse transformer $T_1$. The phase angle of the voltage is varied by adjusting the variable resistor $R_1$ to increase or decrease the amount of resistance in the circuit. Increasing the amount of resistance delays the firing angle of the controlled rectifiers $CR_1$, $CR_2$. Reactor $L_1$ presents a large impedance to current flow to the primary winding 17 of the pulse transformer $T_1$ until it reaches saturation. At this point, the impedance decreases sharply and a current pulse with an abrupt wavefront passes through the primary of the transformer $T_1$. This current pulse induces a corresponding current pulse in one of the secondary windings 18, 19 to provide a current pulse to the gate of one of the controlled rectifiers $CR_1$, $CR_2$. In this circuit as in all of the other circuits described herein, controlled rectifiers $CR_1$, $CR_2$ serve as high speed switching elements that are turned on each half cycle to control the interval of current conduction across switching network lines 93, 94. For a maximum interval of current conduction, the controlled rectifiers $CR_1$, $CR_2$ are fired at the instant the current from the previous half cycle has gone to zero.

A principal advantage of the phase control and switching circuit 98 shown in FIG. 3 is that when controlled rectifiers $CR_1$, $CR_2$ are turned off, the voltage which appears across the controlled rectifiers $CR_1$, $CR_2$ is essentially the voltage which appears across switching network lines 93, 94 reduced by the turns ratio of transformer $T_6$. Such an arrangement makes it possible to employ in the switching network a controlled rectifier having a lesser voltage rating because all of the load voltage does not appear across the controlled rectifiers $CR_1$, $CR_2$. It will be seen that when the controlled rectifiers $CR_1$, $CR_2$ are turned on, transformer $T_6$ is essentially short circuited.

It will be understood that the system and various ballast circuits described herein are intended as illustrative examples of the invention and that the invention is not limited to such embodiments thereof. Further, it will be apparent that many modifications of the particular embodiments of the invention described herein may be made. It is to be understood, therefore, that I intend by the appended claims to cover all such modifications that fall within the true spirit and scope of the invention.

What I claim as new and desire to secure by Letters Patent of the United States is:

1. A phase control and switching circuit for controlling the interval of current conduction from an alternating current supply during each half cycle, said circuit comprising a pair of input terminal leads for connection across the alternating current supply; at least one switching terminal lead for connection to a load; a pair of controlled rectifiers in connected inverse parallel relationship; circuit means connecting said controlled rectifiers in circuit with said switching terminal lead and one of said input leads so that said controlled rectifiers control the interval of current conduction from one of said input leads to the terminal lead during each half cycle of the alternating current supply; each of said controlled rectifiers having an anode, cathode and gate electrode; a saturable reactor and a linear reactor connected in series circuit relationship; a pair of windings inductively coupled on one of said reactors, one of said windings being connected in circuit across the gate and cathode of one of said controlled rectifiers and the other of said windings being connected in circuit across the gate and cathode of the other of said controlled rectifiers, said saturable reactor when saturating causing a pulse of current to flow through said windings of said reactors; a first capacitor and a second capacitor connected in series circuit relationship across said input terminal leads; a third capacitor and a variable resistance means connected in series circuit relationship across said first and second capacitor; circuit means connecting said serially connected saturable reactor and linear reactor with said first capacitor and third capacitor, said variable resistance means controlling the phase angle of the voltage applied across the serially connected saturable reactor and linear reactor thereby controlling the point in each half cycle when said saturable reactor is saturated and said controlled rectifiers are fired to control the interval of current conduction from one of said input leads to the switching terminal lead.

2. The phase control and switching circuit set forth in claim 1 wherein an impedance element is connected in circuit with one of said input leads and said switching terminal lead, said impedance element providing a load so that a holding current can be supplied to a conducting controlled rectifier under open circuit conditions.

3. A phase control and switching circuit for controlling the interval of current conduction from an alternating current supply during each half cycle, said circuit comprising a pair of input terminal leads for connection across the alternating current supply; a first capacitor and a second capacitor connected in series circuit relationship across said input terminal leads so that at least a portion of the voltage of the alternating current supply is applied to said first and said second capacitor; a variable resistance means and a third capacitor connected in series circuit relationship across said first and said second capacitor; a serially connected saturable reactor and linear reactor; at least one winding inductively coupled on one of said reactors in transformer relationship therewith; a switching network including at least one controlled rectifier and a switching terminal lead; circuit means connecting said switching network in circuit with one of said input leads so that the controlled rectifier controls the interval of current conduction from one of said input leads to said switching network lead, said controlled rectifier having an anode, cathode and gate electrode; said winding inductively coupled on said reactor being connected in circuit across the gate and electrode of said controlled recifier; and circuit means connecting said serially connected linear reactor and saturable reactor in circuit across said second capacitor and said variable resistance means.

4. The phase control and switching circuit set forth in claim 3 wherein an impedance element is connected in circuit across one of said input terminal leads and the switching network line, said impedance element providing a load so that a holding current can be supplied to the conducting controlled rectifier under open circuit conditions.

5. A phase control and switching circuit for controlling the interval of current conduction from an alternating current supply during each half cycle, said circuit comprising an input means for connection across the alternating current supply; a switching network lead; a pair of controlled rectifiers connected in inverse parallel relationship; circuit means for connecting said controlled rectifiers in circuit with the alternating current supply and said switching lead so that one of said controlled rectifiers controls the interval of current conduction during the positive half cycle and the other of said controlled rectifiers controls the current during the negative half cycle of the alternating current supply; a serially connected saturable reactor and a linear reactor, one of said reactors having inductively coupled thereon a pair of secondary windings; each of said controlled rectifiers having an anode, cathode and gate electrode; one of said secondary windings being connected in circuit with the gate and cathode of one of said controlled rectifiers and the other of said secondary windings being connected in circuit with the gate and cathode of the other of said controlled rectifiers; and means for applying a voltage variable in phase relative to the supply voltage across said serially connected saturable reactor and linear reactor, the interval of current conduction being controlled by varying the phase angle of the voltage applied across said serially connected saturable reactor and linear reactor.

6. A phase control and switching circuit for controlling the interval of current conduction from an alternating current supply during each half cycle, said circuit comprising a pair of input terminal leads for connection across the alternating current supply; a switching terminal lead; a pair of controlled rectifiers connected in inverse parallel relationship; circuit means connecting said controlled rectifiers in circuit with said switching terminal lead and in circuit with one of said input leads so that said control rectifiers control the interval of current conduction from one of said input leads to said switching terminal lead during each half cycle; each of said controlled rectifiers having an anode, cathode and gate electrode; a serially connected saturable reactor and a linear reactor; a pair of windings inductively coupled with said linear reactor in transformer relationship therewith, one of said windings being connected in circuit with the gate and cathode of one of said controlled rectifiers and the other of said windings being connected in circuit with the gate and cathode of the other of said controlled rectifiers; a first capacitor and a second capacitor being connected in series circuit relationship across said input terminal leads so that at least a portion of the supply voltage is applied to said first and second capacitors; a variable resistance means and a third capacitor connected in series circuit relationship across said first and second capacitors; said serially connected linear reactor and saturable reactor being connected in circuit across said first and third capacitors; and said saturable reactor when saturating causing a pulse of current to flow through the windings of said reactor to trigger one of said controlled rectifiers at a predetermined point in each half cycle in order to control the interval of current conduction from one of said input terminal leads to the switching terminal lead.

7. A phase control and switching circuit for controlling the interval of conduction from an alternating current supply during each half cycle, said circuit comprising a pair of input terminal leads for connection across said alternating current supply, a switching network including at least one control rectifier and a switching network terminal lead; circuit means connecting said switching network in circuit with one of said input terminal leads and said switching network terminal lead so that the interval of current conduction therebetween during each half cycle of the alternating current supply is controlled by triggering said controlled rectifier at a predetermined point in each half cycle; said controlled rectifier having an anode, cathode and a gate electrode; a serially connected saturable reactor and a linear reactor; at least one secondary winding inductively coupled with one of said reactors, said winding being connected in circuit with the gate and cathode of said controlled rectifier; said saturable reactor when saturated providing a pulse of voltage across said winding to trigger said controlled rectifier; and means for applying a voltage variable in phase relative to the supply voltage across said serially connected linear reactor and saturable reactor, the interval of current conduction from one of said input terminal leads to the switching network being controlled by varying the phase angle of the voltage applied across the serially connected saturable reactor and linear reactor.

8. The phase control and switching circuit set forth in claim 7 wherein said means for applying a voltage variable in phase relative to the supply voltage comprises a first capacitor and reactor connected in series circuit relationship across the alternating current supply so as to apply at least a portion of the voltage of said alternating current supply across said first capacitor and reactor, a resistor connected in parallel circuit relationship with said reactor, a variable resistance means and a second capacitor connected in parallel circuit relationship, said serially connected linear reactor and saturable reactor, said second capacitor and variable resistance means being connected in circuit across said first capacitor, said variable resistance means during operation controlling the phase angle of the voltage across said serially connected saturable reactor and linear reactor and thereby controlling the firing angle of said controlled rectifier.

9. The phase control and switching circuit set forth in claim 7 wherein an impedance element is connected across the switching network terminal and one of the input terminal leads so as to provide a voltage divider action across said controlled rectifier in order to limit the voltage which appears across the controlled rectifier during operation.

10. A phase control circuit for supplying a controlled semiconductor rectifier with a firing pulse symmetrically at a predetermined point during each half cycle of an alternating current supply, said circuit comprising a first capacitor, a second capacitor, a pair of input leads for connection across said alternating current supply, a first capacitor and a second capacitor connected in series circuit relationship across said input terminal leads so that at least a portion of the voltage of the alternating current supply is applied across said first and second capacitors, a variable resistance means and a third capacitor connected in series circuit relationship across said first and second capacitors, a serially connected linear reactor and a saturable reactor, said saturable reactor having a winding inductively coupled thereon in transformer relationship in order to provide a firing pulse for said controlled rectifier, said serially connected linear reactor and saturable reactor being connected with said first capacitor and said third capacitor, said variable resistor means controlling the phase angle of the voltage across said serially connected saturable reactor and linear reactor and thereby determining the predetermined point in each half cycle when a firing pulse is supplied to the controlled rectifier.

11. A phase control circuit for firing at least one controlled semiconductor rectifier at a predetermined phase angle during each half cycle of an alternating current supply, said circuit comprising a pair of input terminal leads for connection across the alternating current supply, a first capacitor and a reactor connected in series circuit relationship across said input terminal leads so that at least a portion of the voltage across said alternating current supply is applied across said first capacitor and reactor, a second capacitor, a variable resistance means, said second capacitor and said variable resistance means being connected in parallel circuit relationship, a serially connected linear reactor and saturable reactor, said serially connected linear and saturable reactor being connected in circuit with said second capacitor and variable resistance means across said first capacitor, at least one secondary winding inductively coupled in transformer relationship with said saturable reactor, said saturable reactor when saturated causing a pulse of voltage across said winding, said variable resistance means controlling the phase angle of the voltage across said serially connected saturable reactor and linear reactor so that said current pulse will occur at a predetermined point symmetrically during each half cycle of the alternating current supply.

References Cited by the Examiner

UNITED STATES PATENTS

| | | | |
|---|---|---|---|
| 2,987,666 | 6/1961 | Manteuffel | 323—22 |
| 2,998,547 | 8/1961 | Berman | 323—22 |
| 3,076,924 | 2/1963 | Manteuffel | 323—89 |
| 3,128,422 | 4/1964 | Brown | 321—25 |
| 3,128,440 | 4/1964 | Davis | 323—89 |
| 3,170,085 | 2/1965 | Genuit | 315—227 |

LLOYD McCOLLUM, *Primary Examiner.*

G. P. HASS, D. L. RAE, *Assistant Examiners.*